2,839,546
Patented June 17, 1958

2,839,546
TREATMENT OF BLEACHED PHOSPHATIDES WITH METAL SALTS

Paul F. Davis, Chicago, Ill., assignor to The Glidden Company, Cleveland, Ohio, a corporation of Ohio No Drawing. Application March 14, 1957
Serial No. 645,886

8 Claims. (Cl. 260—403)

The present invention relates to an improvement in the process of preparing peroxide-treated phosphatidic material. More particularly it relates to a process for reducing the peroxide value of bleached lecithin compositions without appreciably degrading the color thereof.

The mixtures of phosphatides derived from vegetable sources, particularly soybeans, peanuts, corn and the like, and commonly called "lecithin" are efficient surface-active agents. Because this material is completely non-toxic, lecithin and particularly soya lecithin, has found widespread application in food products. However, as obtained commercially from vegetable oil-seeds by extraction or mechanical means, lecithin is associated with various chromagenic and odoriferous impurities. Such associated impurities seriously limit the extent to which lecithin is used for edible purposes.

It is common practice to improve the color of crude lecithin by treatment thereof with peroxidic bleaching agents. Hydrogen peroxide, the most common agent for this purpose, was first proposed by Bollmann (D. R. P. 511,851). Other peroxidic agents, such as benzoyl peroxide and lauroyl peroxide, have been advocated but hydrogen peroxide, perhaps due to its relatively low cost, has been used to the greatest extent by far.

The treatment of crude lecithin with peroxides while effective in lightening the color, creates the new problem of removing the excess of the bleaching agent and the products of decomposition and products of side reactions. Contrary to the claims of earlier workers in the art, it is now known that the bleached product has a relatively high peroxide value which markedly affects the stability of the lecithin composition, and to a significant extent, the stability of the compositions with which the bleached lecithin is later associated.

It is an object of this invention to provide bleached phosphatidic compositions of reduced peroxide value.

It is another object of this invention to provide a novel process for reducing the peroxide value of bleached lecithin compositions.

Other objects will be obvious from the following description of the invention. I have found that by contacting bleached lecithin with at least 5 p. p. m. by weight of a salt of a metal selected from the group of manganous manganese, iron, nickel, cobalt and mixtures of these metals in the form of an aqueous solution thereof at a temperature within the range from about 140° to 170° F., while maintaining the mixture mildly alkaline, i. e., pH of about 7.5–9, the peroxide value of the bleached lecithin composition can be reduced to below 100 without noticeable effect upon the color of the bleached lecithin. As a result of the reduction in peroxide value, the stability of the lecithin is improved to a marked extent and its acceptability as an ingredient for food products is greatly enhanced.

Inasmuch as the procedure of my novel process is effected at elevated temperatures, it is surprising that the color of the treated product is not degraded in view of the well-known sensitivity of lecithin to heat.

It has been suggested that (e. g. see Scholfield and Dutton, J. A. O. C. S. 31, 258 (1954)), the color of lecithin and other phosphatides is due principally to several factors, i. e., carotenoids and brown pigments. Bleaching with hydrogen peroxide is effective for the removal of color due to carotenoids. The formation of the brown color (due most likely to an aldehyde amine reaction product) is not prevented or overcome to any marked extent by bleaching but is favored by exposure of the lecithin to heat. While the browning occurs more slowly below 100° C., it is nevertheless surprising and unexpected that at the elevated temperatures at which the treatment according to the present invention is effected, the color of the phosphatides is not degraded.

The effectiveness of the salts of the several metals found to function in the process of this invention varies. Salts of manganous manganese are preferred in amounts of at least 55 p. p. m. by weight since the desired effects are most rapidly obtained and no degradation in the color of the lecithin results. Cobalt salts (ous and ic) have a rate comparable to manganous salts but cobalt salts at alkaline pH give rise to greenish by-products with alkali metal bicarbonates and reddish colors with caustic alkalis. Nickel and iron salts (ous and ic) are less effective due to the lesser rapidity with which they lower the peroxide value. Iron salts further, under the conditions of the treatment, give colored by-products also. It should be noted that even with salts of cobalt and iron which give colored by-products, the effect of such on the color of the treated lecithin is hardly noticeable due to the relatively small amounts of these salts required in the present invention.

The following examples will illustrate the process of this invention:

*Example I*

To 200 grams of crude lecithin heated to 60° C., 1 gram of benzoyl peroxide was added. The mixture was agitated vigorously for five minutes and then 10 ml. of 50% hydrogen peroxide was added. The mass was heated to 80° C. and vacuum applied. After one hour the mixture was cooled to 70° C., and 26.6 ml. of 10.5% aqueous sodium bicarbonate was added, while agitating the lecithin mixture and during a 15-minute period. The peroxide value at this point was 1150. Thereafter 2 ml. of 0.1 M aqueous manganous chloride were added and the mass heated at 70° C. in vacuo, for two hours. The peroxide value of the treated lecithin was 60. After a further two hour period, the peroxide value of the lecithin was 55.

*Example II*

To 150 grams of a mixture of about 50% of the alcohol soluble moiety of lecithin and 50% of margarine oil as carrier, which had been prepared as described in application S. N. 232,868 filed June 21, 1951, by P. L. Julian et al., were added, at 65° C., 0.75 gram of benzoyl peroxide and 3 ml. of 50% hydrogen peroxide. The mixture was heated, in vacuo, to and maintained at 80° C. for 1.5 hours after which the resultant mass was cooled to 65° C.. Thereafter, 13.2 ml. of 10.5% of aqueous sodium bicarbonate was added and the mass was heated at 70–80° C. in vacuo, until its moisture content was reduced to about 3%. The peroxide value of the mixture was 330. Following the addition of 1.5 ml. of 0.1 M aqueous manganous chloride the mixture was heated at 65–70° C. for one hour and ten minutes. The peroxide value had then fallen to 35. The mixture was heated under vacuum for an additional 10 minutes after which the peroxide value had been reduced to 22. The color of the resulting bleached lecithin moiety as measured on the Lovibond scale was 0.6 red–2.0 yellow.

Example III

In a manner similar to that described in Example II above, 150 grams of approximately 60% alcohol insoluble moiety in approximately 40% margarine oil prepared as described in the aforementioned application S. N. 232,868 was bleached with 7½ ml. of 50% hydrogen peroxide by heating the mixture at 80° C. for 2 hours. The mixture was rendered mildly alkaline by the addition of 11.5 ml. of 10.5% aqueous sodium bicarbonate and then heated in vacuo until its moisture content was between 2 and 3%. The peroxide value was then 550. One hour after the addition of 1.5 ml. of 0.1 M aqueous manganous chloride the peroxide value of the mass had been reduced to below 10. The color of the mixture was 0.6 red–2.0 yellow, and was characterized as a light colored product.

Example IV

A mixture of 200 grams of about 50% alcohol soluble moiety of lecithin and 50% margarine oil composition, 2 ml. of 0.1 M aqueous sodium pyrophosphate and 2 ml. of 0.1 M aqueous ferric chloride was heated in vacuo at about 70° C. until the moisture was removed. To this mass 1 gram of benzoylperoxide and 5 ml. of 50% hydrogen peroxide were added and the resulting mixture was heated and agitated in vacuo at 70° C. for 1 hour.

Thereafter, 19.6 ml. of 10.5% aqueous sodium bicarbonate was added in portions to the mass as indicated in the table below. Indicated also are the other treatments and peroxide value of the mass treated.

| NaHCO₃ Added, milliliter | Period of Treatment at 70° C. in vacuo, minutes | P. V. |
|---|---|---|
| 8.3 | 10 | |
| 8.0 | 15 | 275 |
| 2.0 | 60 | 60 |
| 1.3 | 30 | 20 |

The color of the final composition was 0.8 red–15.0 yellow.

This experiment was repeated using 14 ml. of 10% aqueous sodium hydroxide (added in portions of 5 ml., 5 ml., 2 ml., and 2 ml.) with substantially identical results. The peroxide value of the treated lecithin composition was 20 and its color was 0.7 red–15 yellow.

Example V

A mixture of 150 grams of crude lecithin and 2 ml. of 50% hydrogen peroxide was agitated at 75° to 80° C. for 1½ hours. To this mass, the peroxide value of which was 310, 3.75 ml. of 10% aqueous sodium hydroxide and 1.5 ml. of 0.1 M cobaltous chloride was added. The mixture was maintained between 75° and 80° C. for 1 hour after which time the peroxide value had been reduced to 14. After the addition of 3.5 ml. of 10% hydrochloric acid the mass was heated in vacuo to remove the excess moisture. Although cobalt did quickly reduce the peroxide value of the mixture, the resulting product had a definite reddish cast due to the cobalt salts contained therein.

In an analogous experiment differing only in that an equivalent amount of 0.1 M nickelous chloride was used, it was shown that nickel salts react more slowly than cobalt salts. However, the color of the final product is affected to a lesser extent.

From these examples, it will be readily apparent that an effective process for the production of bleached lecithin compositions of relatively low peroxide value has been devised. The secured low peroxide values result in greater stability of the lecithin composition and in greater acceptability of the lecithin by users thereof especially in the food industry. Specifications for various grades of lecithin currently prevalent in the industry require, in general, that the peroxide value be below about 100. By the novel process disclosed herein, it is possible to prepare lecithin compositions with peroxide values of below about 100 without markedly affecting the color of the lecithin. Such products can be stored for longer periods of time and when mixed with other ingredients, as for example in food products, do not contribute to the oxidative breakdown (e. g., development of rancidity) of the resultant composition as has heretofore been the case.

My invention is not limited to the particular compositions disclosed in the above examples. Phosphatidic materials of animal and/or vegetable origin, their alcohol soluble and alcohol insoluble moieties, mixtures of such moieties with or without the whole phosphatidic material of their origin, and dispersions of the whole material or its moieties and mixtures thereof in desired carrier(s), as prepared in the aforementioned application Serial No. 232,868, can be treated equally well. The treatment is also of value in the reduction of the peroxide value in hydroxylated lecithin compositions such as those described and claimed in U. S. P. 2,629,662, wherein peroxide values of 500 or higher can be lowered easily to values under 100.

Any water soluble salt of the metals, manganous manganese, cobalt, nickel and iron can be used. By water soluble is meant any salt soluble to the extent of at least 0.005 gram per liter of water at the temperature of the reaction. Thus instead of the chlorides used in the above examples the bromides, iodides, sulfates, phosphates, acetates, carbonates of these metals can be used. Mixtures of these salts can be used also.

The temperature at which the treatment is effective can be varied from about 100° F. (38° C.) to about 200° F. (93° C.). Preferably, however, the process is conducted between 140° F. and 170° F. in order to minimize the tendency of lecithin to discolor. The time required will depend, of course, upon the original peroxide value of the bleached lecithin composition and the size of the batch being treated. In general at least one but not more than six hours will be required to effect a maximum lowering of the peroxide value. The treatment is preferably conducted in vacuo to assist in the removal of moisture. Various inert gases such as steam, nitrogen, carbon dioxide and the like can be used as sparging agents to assist in this treatment. It will be within the skill of a trained chemist to select the optimum conditions of time, temperature and pressure to suit the needs of the particular type of lecithin composition being treated within the limitations set out hereinabove.

In this specification and the appended claims, the term "peroxide value" is intended to designate the content of reactive oxygen per unit weight of material, as determined by the method of Wheeler ("Oil and Soap," vol. 9, 1932, pages 89–97; also "Oil and Soap," vol. 21, 1944, pages 52–57).

At the conclusion of my described treatment, the phosphatide can be treated with acids (organic e. g. fatty, or mineral) to bring the pH to between about 5–6. (See Journal American Chemical Society 49, 1630 (1927)).

Having described my invention, what I claim is:

1. The process which comprises: adding an aqueous solution of a water soluble salt of a metallic cation selected from the group consisting of manganous manganese, cobalt, nickel and iron, in the amount of at least 5 p. p. m. by weight to a peroxide-treated phosphatide composition which has been rendered mildly alkaline; and heating the resultant mixture at a temperature within the range of 100° F. and 200° F. until the peroxide value thereof has been reduced.

2. The process of claim 1 in which the metallic salt is a manganous salt.

3. The process of claim 2 in which the heating step is effected under vacuum.

4. The process of claim 3 in which the temperature range is between 140° F. and 170° F.

5. The process of claim 4 in which the metallic salt is present in an amount of about 55 p. p. m. by weight.

6. The process of claim 1 in which the heating is effected under vacuum.

7. The process of claim 6 in which the temperature range is between 140° F. and 170° F.

8. The process of claim 7 in which the metallic salt is present in the amount of about 55 p. p. m.

No references cited.